(12) United States Patent
Hong et al.

(10) Patent No.: US 8,341,248 B2
(45) Date of Patent: Dec. 25, 2012

(54) ENERGY-EFFICIENT COMMUNICATION METHOD IN GROUP INFORMATION-BASED SENSOR NETWORK AND SENSOR NETWORK SYSTEM USING THE METHOD

(75) Inventors: Seung Ki Hong, Daejeon (KR); Jong Arm Jun, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 193 days.

(21) Appl. No.: 12/973,628

(22) Filed: Dec. 20, 2010

(65) Prior Publication Data

US 2011/0153865 A1 Jun. 23, 2011

(30) Foreign Application Priority Data

Dec. 21, 2009 (KR) .......... 10-2009-0127706

(51) Int. Cl.
*H04L 12/28* (2006.01)
*H04B 15/00* (2006.01)

(52) U.S. Cl. ........ 709/220; 709/203; 709/228; 370/255; 370/334

(58) Field of Classification Search .................. 709/203, 709/220, 227; 370/255, 334
See application file for complete search history.

(56) References Cited

U.S. PATENT DOCUMENTS

| | | | | |
|---|---|---|---|---|
| 6,057,808 A | * | 5/2000 | Tajima | 345/2.3 |
| 2006/0215624 A1 | * | 9/2006 | Adya et al. | 370/338 |
| 2010/0069035 A1 | * | 3/2010 | Johnson | 455/404.1 |
| 2011/0153865 A1 | * | 6/2011 | Hong et al. | 709/243 |
| 2012/0185570 A1 | * | 7/2012 | Bouazizi et al. | 709/219 |

FOREIGN PATENT DOCUMENTS

KR 1020080052152 A 6/2008

OTHER PUBLICATIONS

Dipanjan Chakraborty et al., "Toward Distributed Service Discovery in Pervasive Computing Environments", IEEE Transactions on Mobile Computing, Feb. 2006, pp. 97-112, vol. 5, No. 2, IEEE.

* cited by examiner

*Primary Examiner* — Khanh Dinh

(57) ABSTRACT

Provided are an energy-efficient communication method in a group information-based sensor network and a sensor network system using the method. A group exchanges group information and data with another group in order to provide an application service through inter-group cooperation in a sensor network. In this process, a target group is discovered, a communication path is established, and inter-group communication cycle information for energy-efficient communication is transmitted. On the basis of the group information and the communication cycle information, it is possible to minimize the network resource consumption and provide an energy-efficient inter-group communication method.

20 Claims, 8 Drawing Sheets

GROUP COMMUNICATION GRAPH

GROUP COMMUNICATION GRAPH

FIG. 10

(1) | SOURCE GROUP | TARGET GROUP | SOURCE ADDRESS | HOT COUNT | DIAMETER | START TIME | CYCLE | LIFE TIME |

(2) | SOURCE GROUP | TARGET GROUP | SOURCE ADDRESS | TARGET ADDRESS | HOT DISTANCE |

(3) | SOURCE GROUP | TARGET GROUP | TARGET NODE# | DIAMETER | LAST BROADCAST TIME | CYCLE | LIFE TIME |

(4) | SOURCE GROUP | TARGET GROUP | SOURCE ADDRESS | PARENT | CHILD NODE# | LAST LISTENING TIME | CYCLE | LIFE TIME | ns
ENERGY-EFFICIENT COMMUNICATION METHOD IN GROUP INFORMATION-BASED SENSOR NETWORK AND SENSOR NETWORK SYSTEM USING THE METHOD

CROSS-REFERENCE TO RELATED APPLICATIONS

This application claims priority under 35 U.S.C. §119 to Korean Patent Application No. 10-2009-0127706, filed on Dec. 21, 2009, in the Korean Intellectual Property Office, the disclosure of which is incorporated herein by reference in its entirety.

TECHNICAL FIELD

The following disclosure relates to an energy-efficient communication method in a group information-based sensor network and a sensor network system using the method. In particular, the following disclosure relates to an energy-efficient communication method in a group information-based sensor network and a sensor network system using the method, which provides a cooperative service between multi-node groups through group-based communication, thereby implementing energy-efficient communication and smooth collection/processing of data in a distributed network.

BACKGROUND

The use of a sensor network including sensor nodes capable of various operations and communications are extending to various application fields such as forest fire monitoring, intrusion monitoring, real-time target tracking, emergency relief systems, and real-time traffic information collection.

Examples of the existing sensor networks are centralized sensor networks and unmanned real-time sensor networks.

In a centralized sensor network, sensing information acquired by each sensor node is transmitted through a sink node to a server, and the server collects the sensing information transmitted.

A self-control sensor network is an unmanned real-time sensor network in which each node or a node group senses a certain event and transmits a control command to an actuator to operate the actuator in order to intelligently determine a certain situation.

Evolving from the existing sensor system of performing a simple sensing operation by a sensor node through a sensor and transmitting the sensing data, a sensor network system such as self-control sensor network processes sensing data, forms a group of nodes in order to determine a certain situation, and requires cooperative communication based on the formed group. Thus, in a self-control sensor network, sensor nodes need be more intelligent and energy-efficient. Also, if necessary during operation, the sensor nodes remotely download an execution code to perform a new program.

A set of nodes sharing one independent program code is called a group. Herein, an independent program needs to communicate with another program. This means the inter-group communication of nodes that executes their respective programs. What is therefore required is a method for creating/constructing a group dynamically, discovering member nodes of a target group in the network under the condition of occurrence of inter-group communication, searching/establishing a communication path, and exchanging messages.

The existing group discovery/communication methods may be classified into two approach methods.

In the first method, a member node broadcasts a group service advertisement through a network to notify group information related to a certain service. When receiving the advertisement, a node stores the related group information in a local cache memory. Accordingly, the local cache is first searched for later group communication.

In the second method, on-demand group discovery is performed through a group service request. In this method, a node desiring communication generates a group discovery request message for a target group, and a member node of the target group receives the request message and generates a reply message to discover a group member.

However, the above approach methods increase the network resource consumption because they broadcast a group service advertisement or a group service request to every node. A unicast-based discovery method is to overcome the above limitation of the broadcast-based discovery method. However, the unicast discovery method may fail to discover a group member node.

In order to complement the broadcast-based group service discovery method, a method is used that broadcasts a group service advertisement or a group service request message by a predetermined hop count. However, if the hop count is incorrectly set, this method may generate excessive messages or may fail to discover a group member node.

SUMMARY

In one general aspect, an energy-efficient communication method between a source node and a target node in a group information-based sensor network includes: discovering a target group by broadcasting a Group Discovery Request (GDR) message through a network, the GDR message including an identifier (ID) of a source group including the source node starting group discovery, an ID of the target group including the target node corresponding to the group discovery target, a hop count field value representing the communication distance between the source node and the target node, and an address of the source node; setting a communication path according to the discovery result; and communicating by the source node and the target node of the discovered target group according to the set communication path.

In another general aspect, a group information-based sensor network system between a source group and a target group includes: a source node being included in the source group, generating a Group Discovery Request (GDR) message including an identifier (ID) of the source group, an ID of the target group corresponding to a group discovery target, a hop count representing the communication distance to a target node included in the target group, and an address of the source node, and broadcasting the generated GDR message through a network to discover the target group; and a target node transmitting a reply message to the source node in response to the GDR message and determining whether to reset a communication path with the source node on the basis of the GDR message.

Other features and aspects will be apparent from the following detailed description, the drawings, and the claims.

BRIEF DESCRIPTION OF THE DRAWINGS

FIG. 10 is a diagram illustrating local entry structures and message structures according to an exemplary embodiment.

DETAILED DESCRIPTION OF EMBODIMENTS

Figure 1:
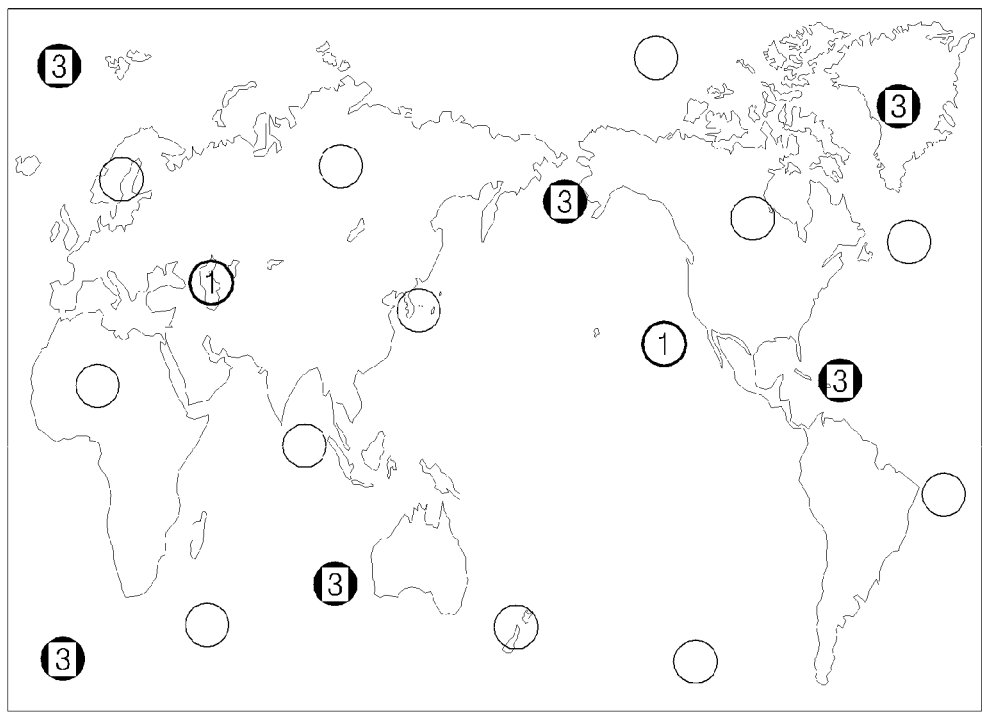
FIGS. 1 and 2 are diagrams illustrating a configuration of a sensor network using a group communication method according to an exemplary embodiment.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In a group-based sensor network, each node operates as a member of one or more groups. The group is a set including one more nodes that drives the same program for a specific purpose. Node's membership of a group may be reconfigured dynamically according to a change in time or situation. That is, while operating as a member of a group, a node may operate as a member of another group and may withdraw from the group at a certain time. The group-based sensor network provides an application service by cooperation with a communication network between the groups. Exemplary embodiments relate to an energy-efficient communication method between groups in a group-based sensor network. In order to provide an application service through cooperation between groups in a sensor network, a group may need to exchange information and data with another group. In the process, it may be necessary to discover a target group, establish a communication path and transmit inter-group communication cycle information for energy-efficient communication. Exemplary embodiments provide an inter-group communication method that is energy-efficient and minimizes the network resource consumption in a group discovery process.

An energy-efficient communication method in a group information-based sensor network according to an exemplary embodiment may include: a process for a source node, which desires group communication, to generate a Group Discovery Request (GDR) message; a process for a member node of a target group to reply thereto; a process for performing actual inter-group communication; and a process for correcting a communication path between the source node and the target node.

In a first operation, a member node of a certain group desiring inter-group communication broadcasts a GDR message. Herein, as illustrated in a portion (1) of FIG. 10, the GDR message may include information about source group ID, target group ID, inter-group communication (or sleep) cycle, communication start time (if inter-node time synchronization is acquired and a start time is present), diameter (the GDR transmission distance to a network), source node address, lifetime (the period of communication between groups), and hop count.

The source group ID means a group identifier for starting group discovery, and the target group ID means a group identifier for a discovery target.

The communication (or sleep) cycle means the cycle of communication between a source group and a target group. That is, the communication cycle means the time cycle of message transmission from the source group to the target group. Therefore, idle listening is not necessary in a non-communication period, thus reducing the energy consumption. In this context, a communication start time field specifies when group communication starts from a source node in an environment where nodes are time-synchronized.

The diameter means a transmission range of the GDR message designated by a hop count. A diameter of the message is designated by a source node. The source node broadcasts the GDR message until the diameter value becomes 0, by decreasing the diameter value one by one whenever the GDR message passes through each node. This is used as information necessary to reduce the network resource consumption that occurs when the message is broadcasted to the entire network.

The source node address is a network address of the source node that generates the GDR message.

The lifetime is the lifetime of group communication, which means the period while intermediate nodes and a target node store related group communication information as one entry in a local cache. When the group communication information is stored in a local entry of the node, a current time and a lifetime field value of the GDR message are added up to the lifetime. Thus, the node may delete the corresponding entry of the local cache after the lifetime. The lifetime is set to reduce the memory resource consumption.

The hop count of the message increases one by one whenever the GDR message passes through each node. The increased hop count of the message is used as information that means the distance from the source node.

In a group discovery process, a node receiving the GDR message (e.g., an intermediate node and a target node) stores and manages related information as one entry in its own local cache memory.

In the GDR message, a diameter field is excepted and an address of the previous node (i.e., the node that has transmitted the GDR message) is additionally stored in an entry as a parent node field. This will be used as information for a routing path when a reply message is transmitted in response to the GDR message and when group communication is performed.

A local cache entry of the corresponding group communication is valid during the time defined in the lifetime field of the GDR message and it may be deleted from the cache thereafter. Upon receiving the GDR message, nodes (an intermediate node and a target node) decrease the diameter value of the message by one. If the decreased value becomes 0, the nodes consider the message as a valid message and store the same in their own local cache. However, they do not broadcast a GDR message anymore.

Intermediate nodes temporarily store the corresponding entry in their own local cache on the basis of the diameter field value of the GDR message. This is to cope with the case where the reply message for the GDR message returns. If the hop count of a diameter field is large, the intermediate nodes temporarily store a diameter field value of the GDR message in their own cache for more time. Thereafter, if there is no reply, the diameter field value may be deleted.

A node receives a GDR message and searches a target group ID field. If the corresponding group is present in its own local, the node transmits a reply message to a source node. The reply message includes fields of information about a source node address, a target node address, a source group ID, a target group Id, a hop count, and the filed information is transmitted to the source node. Herein, the source node address is an address of a node generating the GDR message. The target node address is an address of a node (i.e., a member node of a target node) that replies to the GDR message. The hop count represents the distance of the target node from the source node.

A replying target node unicasts a reply message to the previous node (the parent node) that has transmitted the GDR message. Likewise, a node receiving this transmits the message to the previous node (the parent node) of a local cache entry. Finally, the reply message is transmitted to a source node. At this point, intermediate nodes store detects the number of different target nodes in the corresponding entry of a local cache through the reply message from the target node and stores the same. This enables the intermediate node to collect and process messages from different target nodes in the subsequent group communication. Likewise, the source node detects the number of target nodes through the received reply message.

Accordingly, a communication path for group communication is established.

Communications between a member node of a source group and a member node of a target node are generally classified into two types. In the first communication method, a source group simply transmits a message to a target group. In the second communication method, a source group transmits messages such as inquiry, control and execution code to a target group, and message exchange is performed between the source group and the target group by requesting an acknowledgement for the transmitted message. In other words, the communication methods between a member node of a source group and a member node of a target group may be classified into a method of performing one-way communication from a source group to a target group and a method of performing two-way communication between a source group and a target group.

In a one-way communication method, a message is broadcasted. That is, when a source node broadcasts a message, wake-up intermediate nodes rebroadcast the message. Consequently, the message is transmitted from the source node to a target node.

Message transmission from the source group to the target group is performed by broadcast. For message transmission from the target group to the source group, a target node generates and transmits a message to a parent node of its own local cache entry, and a routing path is determined with reference to a parent node field of a local cache entry of each intermediate node.

In inter-group two-way communication, if a message generated by the source group needs a reply from the target group, the intermediate nodes maintain a listening state until receiving the corresponding reply from the target nodes. Each of the intermediate nodes waits until receiving as many messages as the number of child nodes of an entry. After collection of all the messages, the intermediate node combines or processes the messages and transmits the combined or processed messages to its own parent node.

A member node of the source group and member nodes of the target group perform communication in a 1:n relationship. That is, the member node of the source group is singular and the member nodes of the target group are plural.

The broadcasting of a GDR message is interrupted in two cases. The first case is when a diameter field of the message becomes 0.

In the second case, if a hop count value of an entry for a group pair of a node local cache (a source group ID and a target group ID) is smaller than or equal to the hop count of a received GDR message, the node disregards the GDR message. However, even if the hop count of the GDR message is greater than or equal to the hop count value of the entry for the group pair of the local cache, if a lifetime field value of the GDR message is present and if the added value at the current time is greater than the lifetime field value of the entry for the group pair of the node local cache, that is, if the lifetime of the GDR message remains more at the current time, the node does not disregard the GDR message and stores it in the node local entry for the lifetime.

Unlike the above case, if the hop count field value of the GDR message received by the target node is smaller than the hop count filed value of an entry of the local cache, the entry is corrected and replaced with new field values of the received GDR message. That is, the source node for the source group is replaced in the target node. Thus, the target node and the intermediate nodes set a relationship with a member node of the source group having a shorter communication distance and establish a group communication path newly. Accordingly, an energy-efficient inter-group communication topology is formed.

Even if the hop count field value of the received GDR message is smaller than the hop count field value of the entry of the local cache, the intermediate node broadcasts the message.

However, if detecting a new source node having a shorter communication distance than the existing source node, a target node (i.e., a member node of the target group) transmits a withdrawal message to the existing source node and transmits a reply message to the new source node through a newly-established group communication path. If the intermediate nodes also know it in the withdrawal message transmission process and thus there is no child node, the corresponding entry may be deleted from the local of the node.

When the target node transmits the withdrawal message to the existing source node, the existing intermediate nodes are located on the routing path in the process. Therefore, the existing intermediate nodes naturally know the withdrawal of child nodes and reflect the same in the corresponding cache entry. At this point, if there are two or more child nodes of the entry, each intermediate node decreases it by 1. If there is one child node, no node remains when the one child node withdraws therefrom. Therefore, it deletes the corresponding entry. Likewise, the target node replacing the source node transmits a reply message to the new source node. In the process, the nodes on the routing path become intermediate nodes.

After completion of the group discovery and the path establishment, if a start time value field is valid in the GDR message and if the nodes are time-synchronized, the intermediate node and the target node listen in accordance with the corresponding start time. Thereafter, they repeat a sleep state and an active state according to a communication cycle field value of the cache entry.

However, if the start time value field is invalid in the GDR message and if the nodes are not time-synchronized, the intermediate node and the target node wait until actual group communication starts from the source node.

If the nodes are time-synchronized and if a communication start time is designated in the GDR message, the intermediate node and the target node may maintain a standby state in accordance with the communication start time. Thus, if a communication cycle field value is designated in a local cache entry of the corresponding group communication after the start of the group communication from the source node, the intermediate node and the target node operate in accordance with the communication cycle field value and sleep for other time, thereby reducing the idle listening.

In addition, in the case of two-way group communication, when an intermediate node has two or more child nodes and when periodic communication occurs, it waits until receiving messages from all the corresponding child nodes and combines two or more messages into one, thereby reducing the number of messages. Accordingly, the network resource consumption can be reduced.

Figure 2:
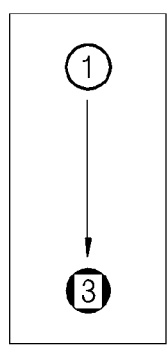

FIGS. 1 and 2 are diagrams illustrating a configuration of a sensor network using a group communication method according to an exemplary embodiment. FIG. 1 is a diagram illustrating the arrangement of sensor nodes in a sensor network. FIG. 2 is a diagram illustrating the communication between two independent groups included in the sensor network of FIG. 1.

Referring to FIG. 1, a sensor network using a group communication method according to an exemplary embodiment has a plurality of sensor nodes in an application region. Each of the sensor nodes is mounted with a sensor or an actuator and may be mobile or stationary. It is capable of wired or wireless communication and receives power from a battery or a power supply unit. In FIG. 1, one node may become a member of one or more groups, which is identified by a group ID. In this embodiment, ① and ③ denote group identifiers (IDs). ① denotes a source group and ③ denotes a target group.

Referring to FIG. 2, the source group ① transmits a Group Discovery Request (GDR) message to the target group ③.

Figure 3:
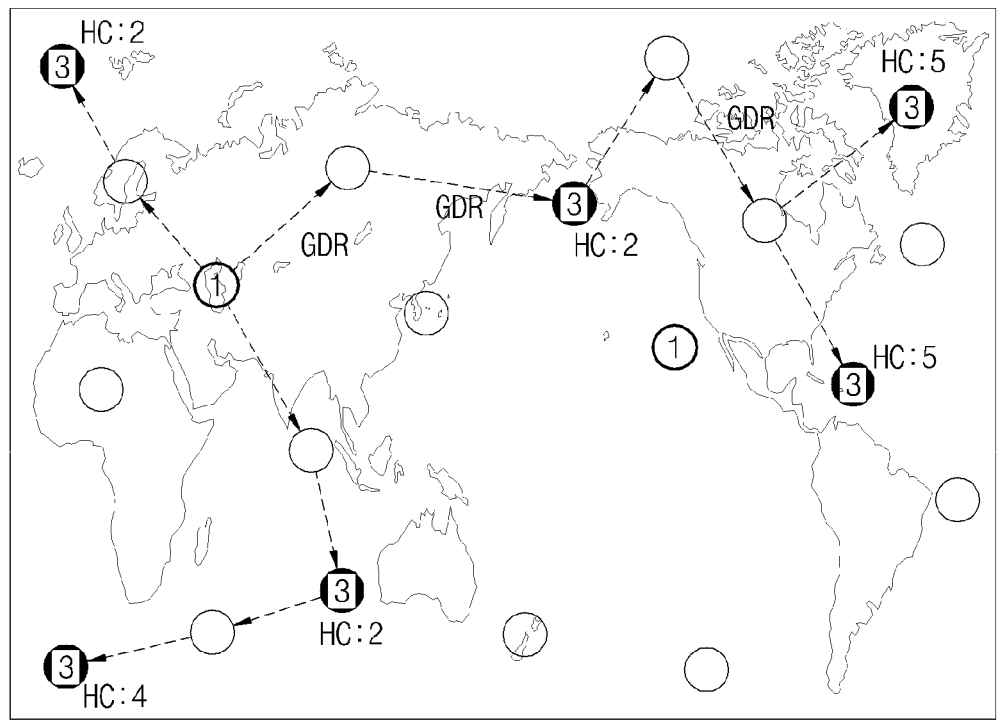
FIG. 3 is a diagram illustrating a process for a source node, which is a member of a source group, to broadcast a Group Discovery Request (GDR) message through a network in order to detect member nodes of a target group.

FIG. 3 is a diagram illustrating a process for a source node, which is a member of a source group, to broadcast a Group Discovery Request (GDR) message through a network in order to detect member nodes of a target group.

Referring to FIG. 3, while a GDR message passes through nodes, a hop count field value HC of the message increases 1 by 1 and a diameter field value decreases 1 by 1.

A node, which has received the GDR message one time, disregards the overlapping GDR message.

Member nodes of the target group ③, which has received the GDR message, transmit reply messages to the source message through a routing path of the GDR message. In this process, the intermediate node on the routing path also recognizes the reply message. Herein, the packet structure of the GDR message is as illustrated in the portion (1) of FIG. 10, and the reply message for the GDR message is the same as illustrated in the portion (2) of FIG. 10. The packet structure of the GDR message is the same as illustrated in the portion (1) of FIG. 10, and is the same as described above. As illustrated in the portion (2) of FIG. 10, the reply message for the GDR message includes a source group ID, a target group ID, a source node address, a target node address, and a hop distance.

Figure 4:
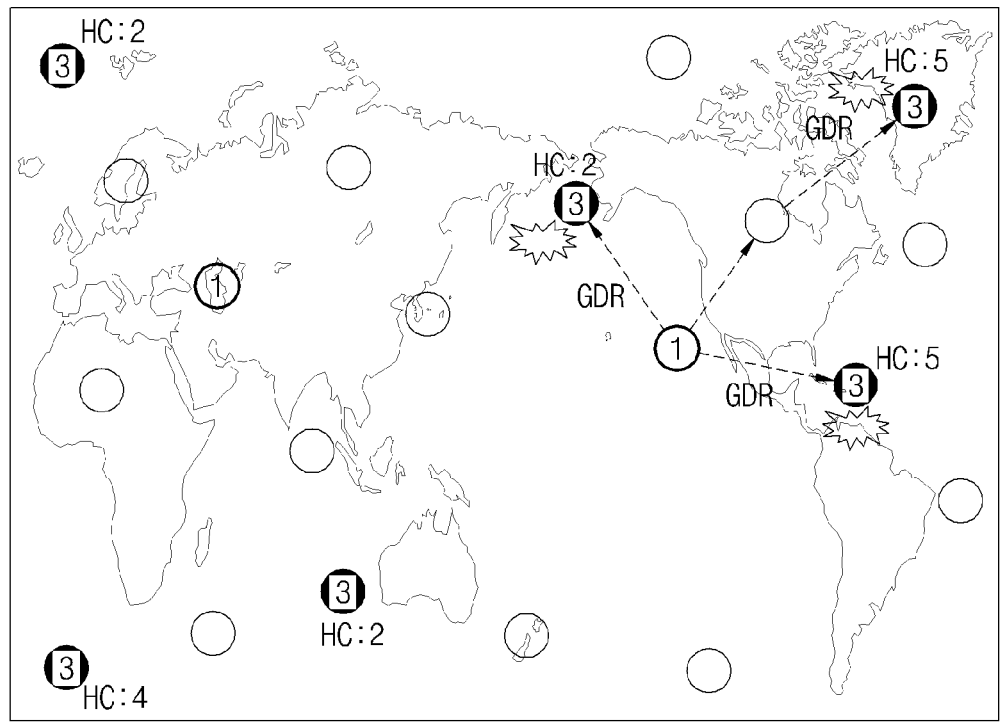
FIGS. 4 and 5 are diagrams illustrating a process for another source node, which is a member of the source group, to discover target nodes, which are members of the target node, by broadcasting a GDR message and to replace an entry of a cache memory by comparing it with the existing value.
Figure 5:
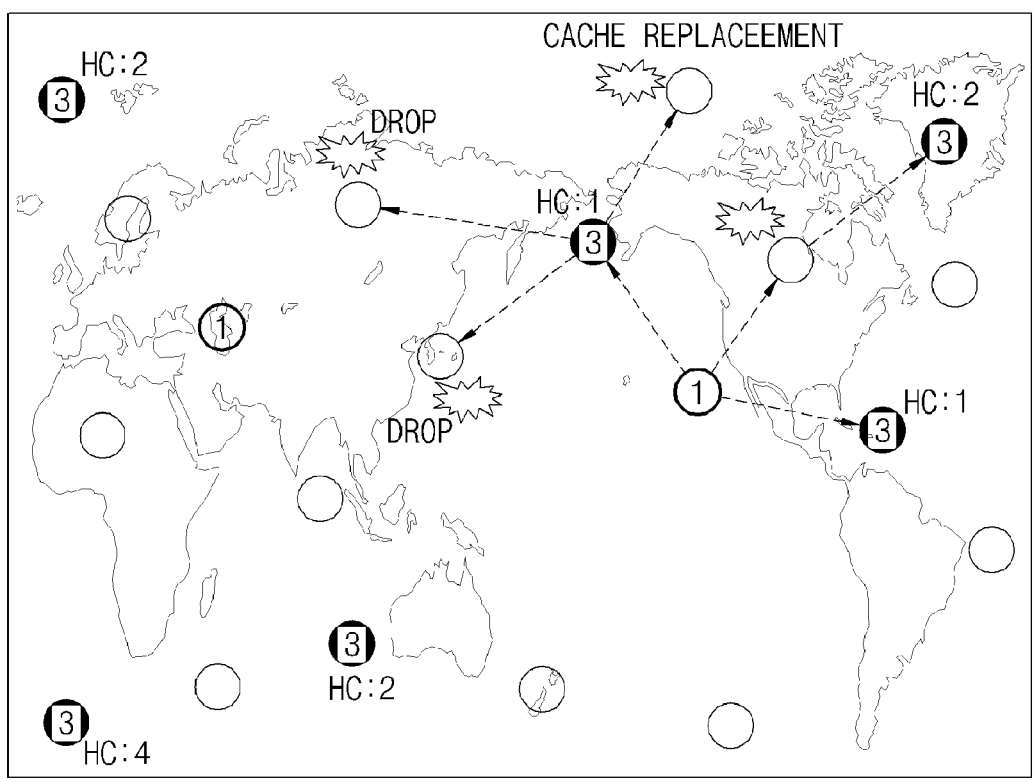

FIGS. 4 and 5 are diagrams illustrating a process for another source node, which is a member of the source group, to discover target nodes, which are members of the target node, by broadcasting a GDR message and to replace an entry of a cache memory by comparing it with the existing value. Herein, a target node, which has the shortest communication distance among the target nodes communicating with the existing source group, is replaced by a new source node.

Figure 6:
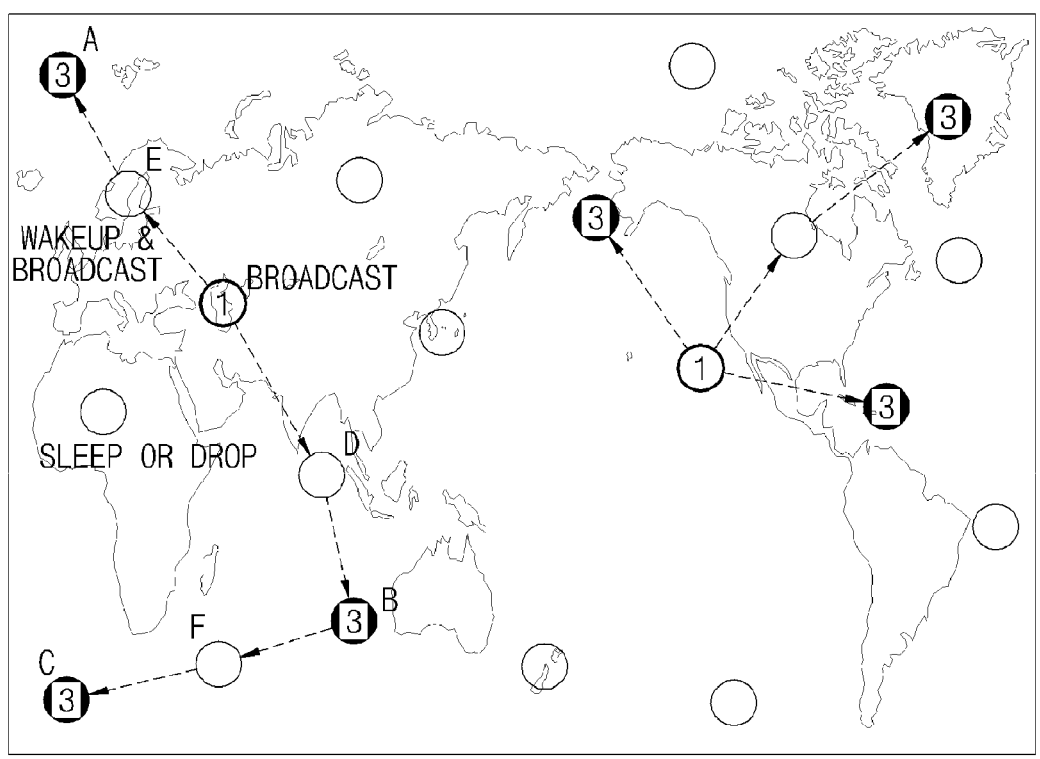
FIG. 6 is a diagram illustrating a process of performing a group discovery and performing a communication between a source group and a target group.

FIG. 6 is a diagram illustrating a process of performing a group discovery and performing a communication between a source group and a target group.

Referring to FIG. 6, if communication is performed periodically, the intermediate node and the target node may maintain a sleep state in the non-communication period because they communicate with the source node periodically. FIG. 6 illustrates one-way communication in which the source group transmits the message to the target group.

Figure 7:
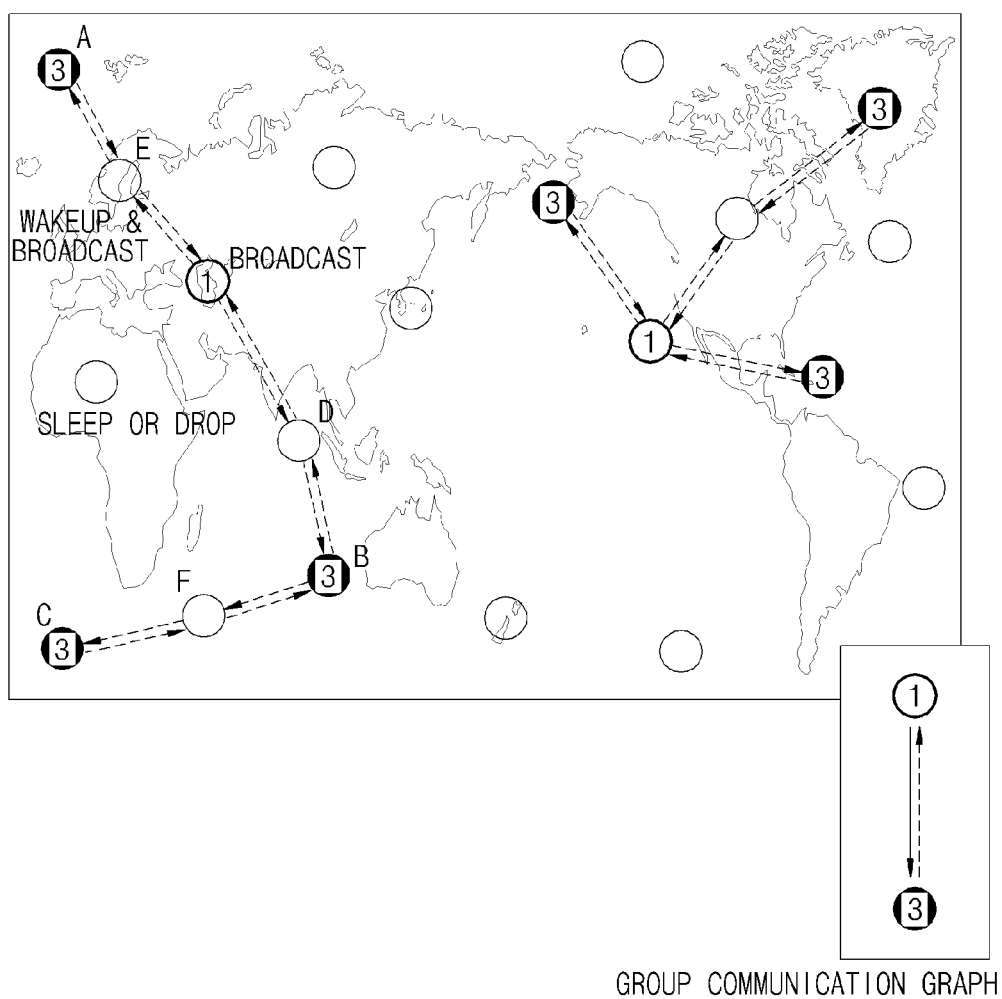
FIG. 7 is a diagram illustrating a process of performing two-way communication between a source group and a target group.

FIG. 7 is a diagram illustrating a process of performing two-way communication between a source group and a target group.

Referring to FIG. 7, a source node of the source group generates and transmits a GDR message to a target node of the target group, and the target node receives a reply message transmitted in response to the GDR message. In this case, target nodes of the target group transmit the message to the source node through a routing path (E→A→E, D→B→F→C→F→B→D) that passes through the intermediate nodes.

Figure 8:
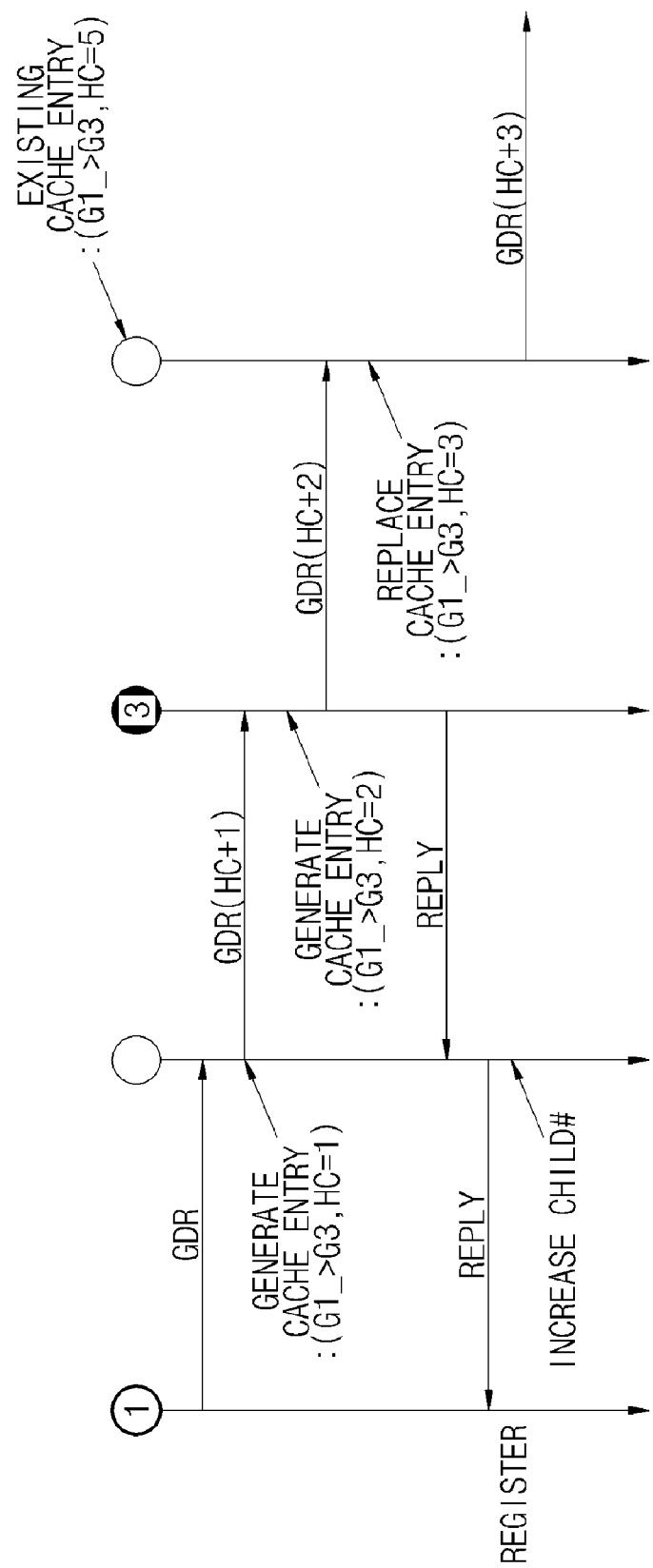
FIG. 8 is a message flow diagram illustrating a process for a member node of a source group to broadcast a GDR message through a network to discover member nodes of a target group.

FIG. 8 is a message flow diagram illustrating a process for a member node of a source group to broadcast a GDR message through a network to discover member nodes of a target group.

Referring to FIG. 8, a member node of the target group ③ transmits a reply message to a member node of the source group ① in response to a GDR message. In this process, the intermediate node and the source node recognize the reply message. The GDR message is discarded if a diameter field value of the message becomes 0 or it is not smaller than a hop count field value of the existing cache entry of a receiving node.

Figure 9:
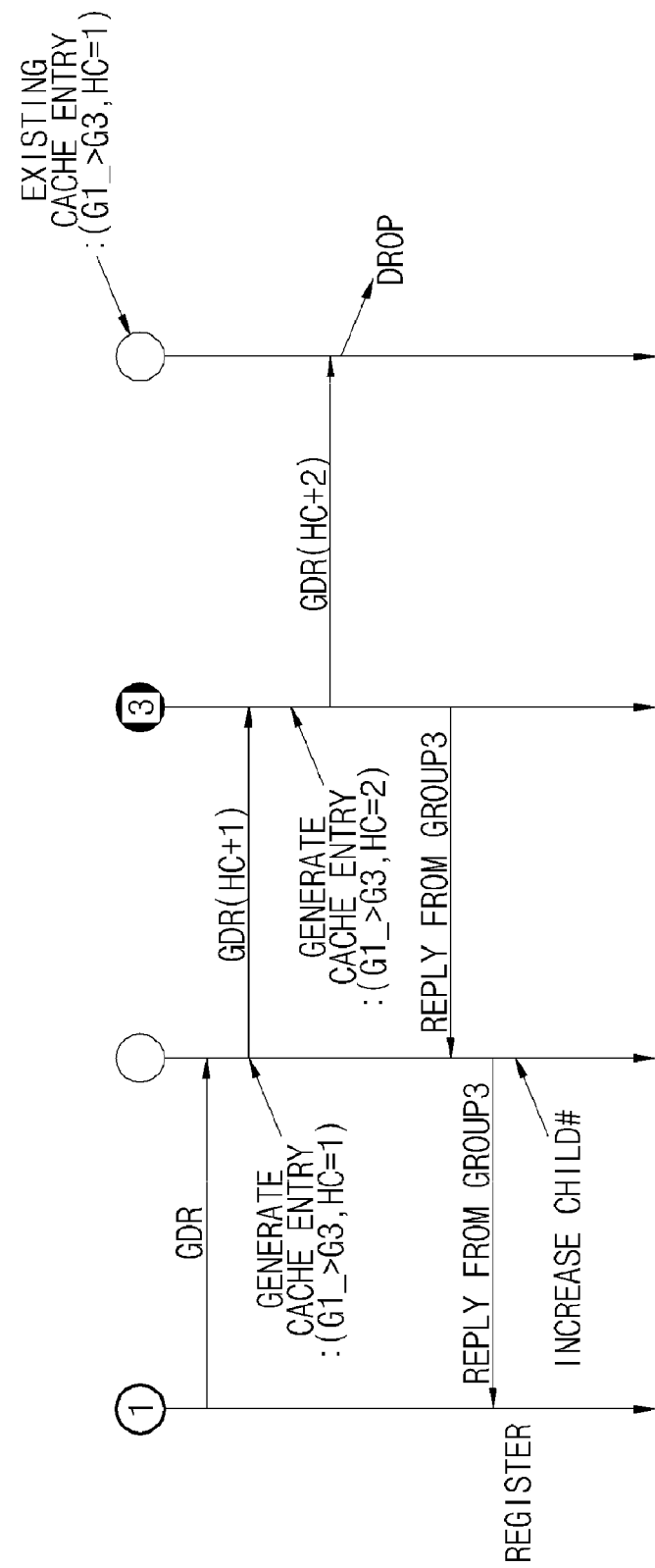
FIG. 9 is a message flow diagram illustrating a process of replacing the existing cache entry value in broadcasting a GDR message.

FIG. 9 is a message flow diagram illustrating a process of replacing the existing cache entry value in broadcasting a GDR message.

Referring to FIG. 9, if a hop count field value of a GDR message is smaller than a hop count field value of the existing cache entry, a target node (i.e., a member node of the target group ③) replaces it by a new source node and notifies this through a reply message. If it is replaced, the target node transmits a withdrawal message also to the existing source node to notify the fact to the existing source node and the intermediate nodes.

FIG. 10 is a diagram illustrating local entry structures and message structures according to an exemplary embodiment.

FIG. 10 illustrates two message structures and three entry structures.

The portion (1) of FIG. 10 is the structure of a GDR message, and the portion (2) of FIG. 10 is the structure of a reply message for the GDR message. These have already been described above, and thus a detailed description thereof will be omitted for conciseness.

The portion (3) of FIG. 10 is the structure of a local cache entry of a source node, and the portion (4) of FIG. 10 is the structure of a local cache entry of an intermediate node. For reference, an intermediate node may become a target node. A target node may become an intermediate node if it has a child node.

The portion (5) of FIG. 10 is the structure of a local cache entry of a leaf node. The leaf node means a node without a child node. Thus, the leaf node is a target node and is located at the rear end of a routing path.

The communication method and system of the present invention are not limited to the above described embodiments. For example, the communication method of the present invention is advantageous to applications such as forest fire monitoring and intrusion monitoring, but it is not limited thereto. Also, the sensor network using the communication method of the present invention is not limited to tree-type networks.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An energy-efficient communication method between a source node and a target node in a group information-based sensor network, the energy-efficient communication method comprising:
   discovering a target group by broadcasting a Group Discovery Request (GDR) message through a network, the GDR message including an identifier (ID) of a source group including the source node starting group discovery, an ID of the target group including the target node corresponding to the group discovery target, a hop count field value representing the communication distance between the source node and the target node, and an address of the source node;
   setting a communication path according to the discovery result; and
   communicating by the source node and the target node of the discovered target group according to the set communication path.

2. The energy-efficient communication method of claim 1, wherein in the discovering of a target group, the source node broadcasts the GDR message to the target group.

3. The energy-efficient communication method of claim 1, wherein in the discovering of a target group, the hop count increases 1 by 1 whenever passing through intermediate nodes located on a communication path between the source node and the target node.

4. The energy-efficient communication method of claim 3, wherein the setting of a communication path comprises:
   comparing, by the target node, the previous hop count included in the previously-received GDR message and the current hop count included in the currently-received GDR message; and
   determining, by the target node, whether to reset the communication path with the source node of the source group, which has transmitted the previously-received GDR message, according to the comparison result.

5. The energy-efficient communication method of claim 4, wherein in the determining of whether to reset the communication path, if the previous hop count is smaller than or equal to the current hop count, the target node maintains the communication path with the source node of the source group that has transmitted the previously-received GDR message.

6. The energy-efficient communication method of claim 4, wherein in the determining of whether to reset the communication path, if the previous hop count is greater than the current hop count, the target node resets the communication path with the source node of the source group, which has transmitted the previously-received GDR message, to the communication path with the source node of the source group that has transmitted the currently-received GDR message.

7. The energy-efficient communication method of claim 6, wherein the target node transmits a notification message of the communication path resetting to the source node of the source group that has transmitted the previously-received GDR message.

8. The energy-efficient communication method of claim 1, wherein in the discovering of a target group, the GDR message further including communication cycle information between the source node of the source group and the target node of the target group is broadcasted through the network.

9. The energy-efficient communication method of claim 8, wherein the source node and the target node do not perform a communication operation during a non-communication period on the basis of the communication cycle information to reduce the power consumption.

10. The energy-efficient communication method of claim 1, wherein in the discovering of a target group,
   the GDR message further including lifetime information for communication between the source group and the target group is broadcasted through the network, and
   the lifetime information is a period for storing group information managed in a local cache memory in an entry type by each of the target node and intermediate nodes located on the communication path between the source node and the target node.

11. The energy-efficient communication method of claim 10, wherein the intermediate nodes and the target node delete the entry-type group information at the lapse of the lifetime.

12. The energy-efficient communication method of claim 1, wherein the target node receiving the GDR message unicasts a reply message through the set communication path in response to the GDR message.

13. The energy-efficient communication method of claim 1, further comprising storing the group information of the GDR message in the local cache memory of the target node receiving the GDR message.

14. The energy-efficient communication method of claim 13, further comprising storing the group information of the GDR message in the local cache memory of each of intermediate nodes located on the communication path between the source node and the target node.

15. The energy-efficient communication method of claim 14, further comprising storing the previous node, which has transmitted the GDR message, a parent node field in the local cache memory of each of the intermediate nodes and the target node.

16. A group information-based sensor network system between a source group and a target group, the group information-based sensor network system comprising:
   a source node being included in the source group, generating a Group Discovery Request (GDR) message including an identifier (ID) of the source group, an ID of the target group corresponding to a group discovery target, a hop count representing the communication distance to a target node included in the target group, and an address of the source node, and broadcasting the generated GDR message through a network to discover the target group; and a target node transmitting a reply message to the source node in response to the GDR message and determining whether to reset a communication path with the source node on the basis of the GDR message.

17. The group information-based sensor network system of claim 16, wherein if the source group and the target group perform two-way communication and if an intermediate node between the source node and the target node has two or more child nodes, the source node waits until receiving a message from each of all the child nodes and combines the respective messages into one.

18. The group information-based sensor network system of claim 16, wherein the target node compares the previous hop count included in the previously-received GDR message and the current hop count included in the currently-received GDR message, and determines whether to reset a communication path with the source node of the source group, which has transmitted the previously-received GDR message, according to the comparison result.

19. The group information-based sensor network system of claim 18, wherein if the previous hop count is smaller than or equal to the current hop count, the target node maintains the communication path with the source node of the source group that has transmitted the previously-received GDR message.

20. The group information-based sensor network system of claim 18, wherein if the previous hop count is greater than the current hop count, the target node resets the communication path with the source node of the source group, which has transmitted the previously-received GDR message, to the communication path with the source node of the source group that has transmitted the currently-received GDR message.

* * * * *